US005490450A

United States Patent [19]

Lee

[11] Patent Number: 5,490,450

[45] Date of Patent: Feb. 13, 1996

[54] INVERTER COOKER WITH A HIGH VOLTAGE/LOW VOLTAGE SEPARATING DEVICE

[75] Inventor: Min G. Lee, Changwon, Rep. of Korea

[73] Assignee: Gold Star, Ltd., Seoul, Rep. of Korea

[21] Appl. No.: 308,085

[22] Filed: Sep. 16, 1994

[30] Foreign Application Priority Data

Sep. 17, 1993 [KR] Rep. of Korea .................... P93-19020

[51] Int. Cl.[6] .............................. A47J 37/00; H05B 6/06; H05B 6/08; H05B 6/68

[52] U.S. Cl. ................................ 99/337; 99/325; 99/492; 219/624; 219/625; 219/665; 219/492

[58] Field of Search ............................. 99/325–331, 337, 99/338, 487, 468, 492; 219/710, 719–723, 708, 623–626, 663–665, 703; 336/221–223; 363/97, 98

[56] References Cited

U.S. PATENT DOCUMENTS 4,601,004 7/1986 Holt et al. ................................ 99/328
4,636,949 1/1987 Longabaugh ............................. 99/327
5,004,881 4/1991 Lee .......................................... 219/663
5,124,518 6/1992 Lee .......................................... 219/718
5,253,564 10/1993 Rosenbruck et al. ..................... 99/328
5,274,209 12/1993 Edamura .................................. 99/325
5,293,019 3/1994 Lee .......................................... 219/708
5,324,906 6/1994 Dong ....................................... 219/667
5,329,100 7/1994 Lee .......................................... 219/664
5,376,775 12/1994 Lee .......................................... 219/664
5,378,877 1/1995 Lee .......................................... 219/720

*Primary Examiner*—Timothy F. Simone
*Attorney, Agent, or Firm*—Poms, Smith, Lande & Rose

[57] ABSTRACT

An inverter cooker with a high voltage/low voltage separating device, which can protect the user from accident and prevents the inverter cooker from malfunctioning by separating a low voltage circuit portion from high voltage circuit portion regardless of the performance of signal transmission. According to the inverter cooker, the signal intercommunicating between the high voltage circuit portion such as an inverter controller or a current detector and the low voltage circuit portion such as a function key input device or a system controller is performed through the high voltage/low voltage separating device which has a plurality of photocouplers.

2 Claims, 3 Drawing Sheets

FIG. 3

| COOKING CONDITION \ PHOTO COUPLER | PC1 | PC2 |
|---|---|---|
| HIGH | ON | ON |
| MEDIUM | ON | OFF |
| LOW | OFF | ON |
| OFF | OFF | OFF |

INVERTER COOKER WITH A HIGH VOLTAGE/LOW VOLTAGE SEPARATING DEVICE

BACKGROUND OF THE INVENTION

1. Field of the Invention

The present invention relates to an inverter cooker, and more particularly to an inverter cooker having a high voltage/low voltage separating device for electrically separating a low voltage circuit portion from a high voltage circuit portion, which can protect a user from mishap caused by a high voltage leaking to the low voltage circuit portion, such as a function key input device, and which prevents also the low voltage circuit portion from malfunctioning.

2. Description of the Prior Art

FIG. 1 is a block diagram of a conventional inverter cooker. According to FIG. 1, a conventional inverter cooker is provided with a first rectifier 100 for rectifying an input AC source; a smoothing filter 101, composed of a choke coil L1 and a capacitor C1, for smoothing a ripple voltage rectified by the first rectifier 100; an inverter section 102 which is composed of a working coil 102*a* which heats food in a container 112 with an eddy current generated by an electromagnetic induction effect obtained by switching the direct current outputted from the smoothing filter 101, a resonance capacitor C2 which constitutes a series resonance circuit with the working coil 102*a*, a switching device Q1 and a damping diode D1; an inverter controller 103, composed of a voltage detector 103*a*, a triangular wave generator 103*b*, and a comparator 103*c*, for detecting a voltage from the inverter section 102 and generating a pulse width modulation (hereinafter referred to as PWM) signal according to the detected voltage; and a switching controller 104 which controls the the on/off operation of the switching device Q1 in the inverter section 102 according to the PWM signal generated from the inverter controller 103.

The inverter cooker is also provided with a current detector 105 for detecting a current from the input AC source; a step-down transformer 108 for lowering the voltage of the input AC source; a second rectifier 109 for recifying the voltage lowered by the step-down transformer 108; a function key input device 110 for entering cooking function key signals, for example 'high-level cooking', 'medium cooking', 'low-level cooking', 'keeping warm' and so forth; a system controller 111 for controlling the operation of the inverter cooker according to the function key signal from the function key input device 110; a negative feedback amplifier 106 for comparing the current detected by the current detector 105 with the control signal outputted from the system controller 111; and an integrator 107 for integrating the compared value outputted from the negative feedback amplifier 106, and outputting the integrated value to the comparator 103C in the inverter controller 103.

In the conventional inverter cooker constructed as above, commercial AC source is rectified to a ripple voltage by the first rectifier 100, and then smoothed to a real DC by the smoothing filter 101. Since the AC source is connected with the step-down transformer 108, the AC voltage is lowered by the step-down transformer 108. The lowered AC voltage is rectified by the second rectifier 109 and then supplied as a low voltage VCC to the function key input device 110 and the system controller 111. After the DC voltage output from the smoothing filter 101 enters the inverter section 102, this voltage is switched by the switching device Q1 and becomes continuing resonance state by the working coil 102*a* and the resonance capacitor C2. Accordingly, a large resonance current flows through the working coil 102*a* and the eddy current is induced to the container 112 by the electromagnetic induction effect and thereafter food in the container will be heated. The switching device Q1 is driven by the PWM signal controlled by the triangular wave generator 103*b* and the comparator 103*c*, the damping diode D1 absorbs counter-electromotive voltage caused by the working coil 102*a* when the switching device Q1 goes off and thus plays a role in protecting the switching device Q1.

The voltage detector 103*a* in the inverter controller 103 detects the resonance voltage generated by the working coil 102*a*, and outputs the detected resonance voltage to the triangular wave generator 103*b*. The triangular wave generator 103*b* generates a triangular wave signal, which decides the on/off timing of the switching device Q1 in the inverter section 102, according to the detected voltage of the voltage detector 103*a* and outputs the triangular wave signal to the negative input terminal of the comparator 103*c*.

Meanwhile, the current detector 105 detects the current from the input AC source as a voltage value and outputs the detected value to the negative input terminal of the negative feedback amplifier 106. The negative feedback amplifier 106 compares the input voltage with the reference voltage outputted from the system controller 111, and outputs the compared value to the integrator 107. The integrator 107 integrates the compared value in order to determine an on/off timing of the switching device Q1 in the inverter section 102, and outputs the integrated value to the positive input terminal of the comparator 103*c* through a diode D2.

The comparator 103*c* compares the triangular wave signal from the triangular wave generator 103*b* with the integrated signal from the integrator 107, and outputs the PWM signal for determining an on/off timing of the switching device Q1 in the inverter section 102, to the switching controller 104. Thus, the switching device Q1 is turned on/off according to the PWM signal, causing the working coil 102*a* also to be switch-control-led.

However, the conventional inverter cooker has the disadvantages that, since the high voltage (about 800 V) line is directly connected with the second rectifier 109, the inverter controller 103, the function key input device 110, and the system controller 111 which work with the low supply voltage, the user likely to be harmed by the electrical shock and the like, when the user operates the function key in situations where that the function key input device is infiltrated by humidity or any other alien substance. Furthermore, in these systems, the system controller 111 is apt to malfunction.

SUMMARY OF THE INVENTION

It is an object of the present invention to provide an inverter cooker with a high voltage/low voltage separating device for electrically separating the low voltage circuit portion from the high voltage circuit portion. This separation can prevent the user from being harmed by electrical shock and the like through the function key input device, and can prevent the system controller from malfunctioning by preventing the high voltage surge or a leakage current from flowing in the low voltage circuit portion.

To achieve the above object, the present invention provides an inverter cooker with a high voltage/low voltage separating device, comprising:

a first rectifying and smoothing means for rectifying and smoothing an input AC source;

an inverter for heating food in a container with an eddy current generated by electromagnetic induction effect by switching the output of said first rectifying and smoothing means;

an inverter controller for generating a PWM signal for controlling said inverter;

a current detector for detecting a current from said input AC source;

a second rectifying and smoothing means for rectifying and smoothing said input AC source;

a function key input means for selecting cooking and other functions, the function key input means operating with the output voltage of said second rectifying and smoothing means;

a system controller for controlling the operation of said inverter cooker according to the output of said function key input means, said system controller operating with the output of said seond rectifying and smoothing means;

means for detecting the existence of said container according to the output of said current detector; and a high voltage/low voltage separating means for delivering the output signal of said system controller to said inverter controller with said system controller and said inverter controller electrically separated from each other and delivering the output signal of said container detecting means to said system controller with said container detecting means and said system controller electrically separated from each other.

BRIEF DESCRIPTION OF THE DRAWINGS

The above object and other advantages of the present invention will become more apparent by describing the preferred embodiment of the present invention with reference to the attached drawings, in which:

FIG. 3 is a table showing the switched state of the high voltage/low voltage separating device in FIG. 2 according to setting of the cooking condition.

DETAILED DESCRIPTION OF THE PREFERRED EMBODIMENT

Figure 1:
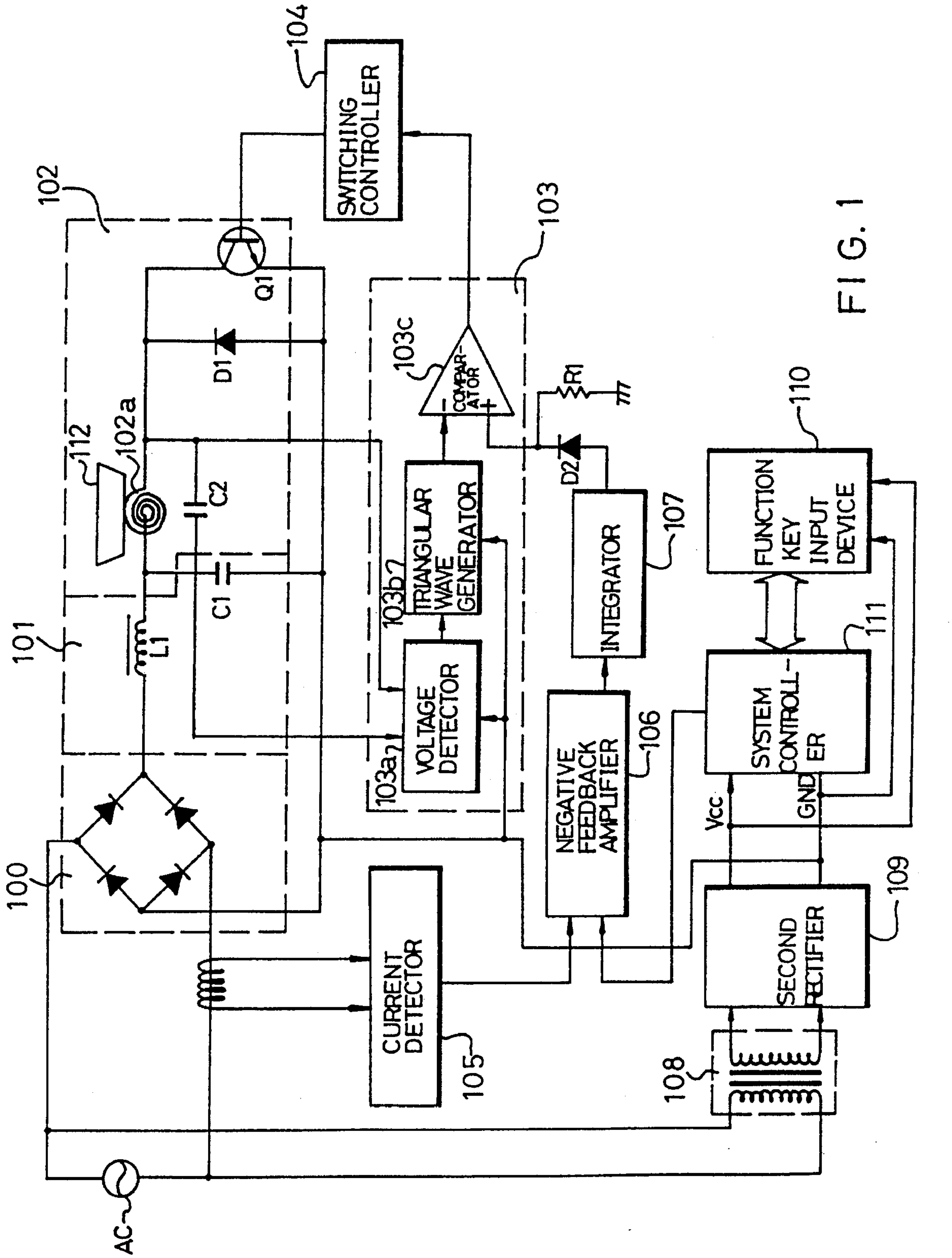
FIG. 1 is a block diagram of a conventional inverter cooker.
Figure 2:
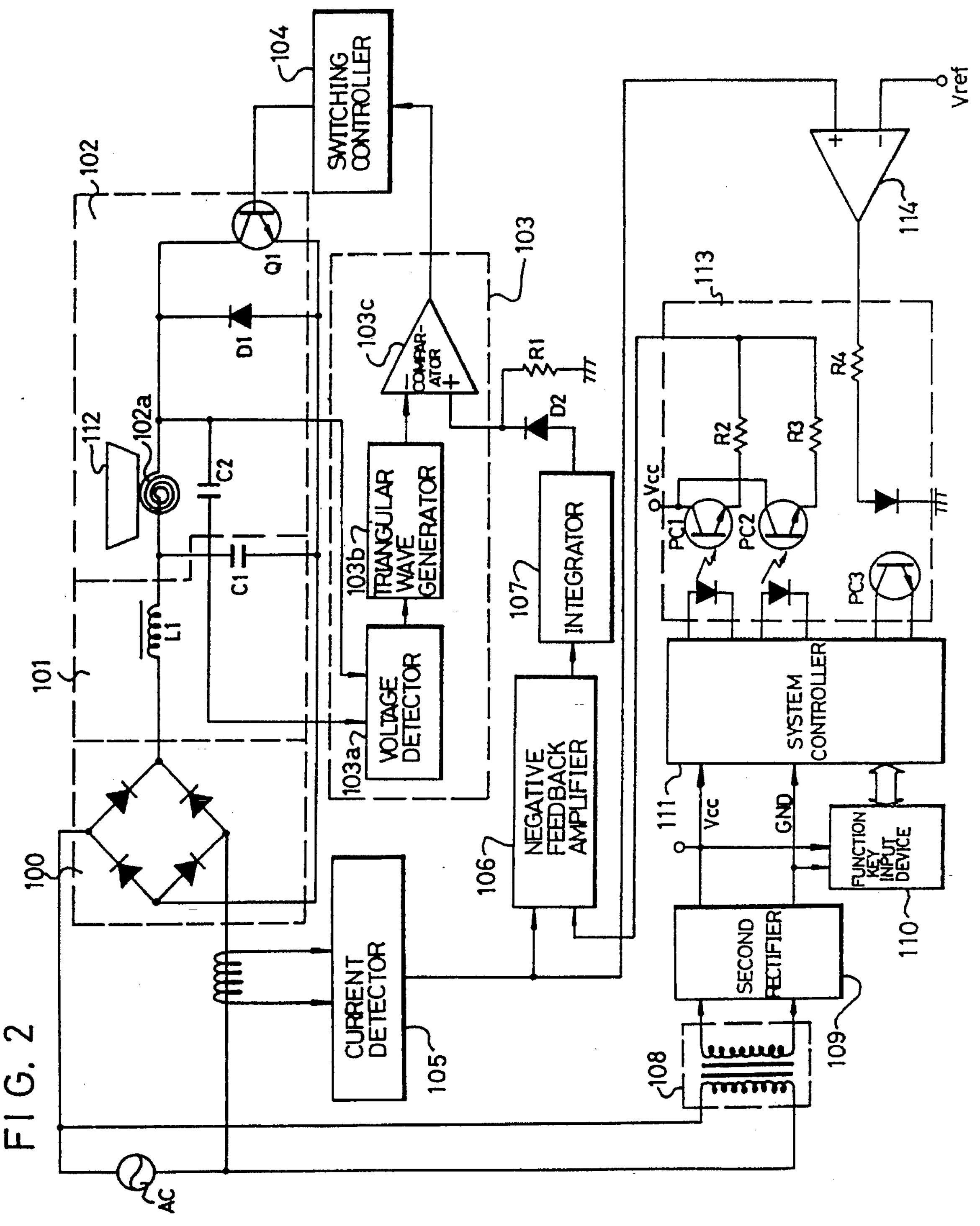
FIG. 2 is a block diagram of the inverter cooker with a high voltage/low voltage separating device according to the present invention.

FIG. 2 is a block diagram of the inverter cooker with a high voltage/low voltage separating device according to the present invention. With reference to FIG. 2, the inverter cooker is provided with a first rectifier 100, having a choke coil L1 and a capacitor C1, for rectifiying an input AC source; a smoothing filter 101 for smoothing the ripple voltage rectified by the first rectifier 100; an inverter section 102 having a working coil 102*a* for heating food in a container 112 with an eddy current generated by the electromagnetic induction effect by switching the direct current outputted from the smoothing filter 101, and a resonance capacitor C2 which makes a series resonance circuit with the working coil 102*a*, a switching device Q1 and a damping diode D1; an inverter controller 103 having a voltage detector 103*a*, a triangular wave generator 103*b*, and a comparator 103*c* for detecting the voltage from the inverter section 102, and generating the PWM signal according to the detected voltage; and a switching controller 104 for controlling an on/off operation of the switching device Q1 in the inverter section 102 according to the PWM signal generated from the inverter controller 103.

The inverter cooker is also provided with a current detector 105 for detecting the current from the input AC source; a step-down transformer 108 for lowering the input AC source; a second rectifier 109 for rectifying the voltage lowered by the step-down transformer 108; a function key input section 110 for selecting cooking functions, for example 'high-level cooking', 'medium cooking', 'low-level cooking', 'keeping warm' and so forth; a system controller 111 for controlling the operation of the inverter cooker according to the key input signal selected by the function key input device 110; a negative feedback amplifier 106 for comparing the current detected by the current detector 105 with the control signal outputted from the system controller 111; and an integrator 107 for integrating the compared value outputted from the negative feedback amplifier 106; a high voltage/low voltage separating section 113 having a first to third photo-coupler PC1-PC3 for electrically separating a system control reference voltage Vref generated from the system controller 111 from the high voltage line; and a container detector 114 for detecting the existence of the container 112 by comparing the current value detected as a voltage value from the current detector 105 with the reference voltage Vref.

The operation of the inverter cooker according to the present invention as constructed above will now be described in detail.

Since the composition and the operations of the first rectifier 100, the smoothing filter 101, the inverter section 102, the inverter controller 103, the switching controller 104, the current detector 105, the negative feedback amplifier 106, the integrator 107, and the second rectifier 109 in FIG. 2 are the same as those in the prior art as described above, the descriptions there of will be omitted.

When the user select any cooking function, such as 'high-level cooking', 'medium cooking', 'low-level cooking', or 'keeping warm', through the function key input device, the system controller 111 outputs the system control signal. This system control signal is inputted to the negative feedback amplifier 106 through the first and the second photo-coupler PC1, PC2 in the high voltage/low voltage separating device. The first and the second photo-couplers PC1 and PC2 in the high voltage/low voltage separating device deliver the system control signal outputted from the system controller 111 to the negative feedback amplifier 106 by way of light emitting and receiving operation of each photo-coupler.

Specifically, the system controller 111 activates the first photo-coupler PC1 and the second photo-coupler PC2 alternatively according to the selected cooking function and thereafter outputs the system control signal to the negative feedback amplifier 106 in accordance with the combination of the first photo-coupler PC1 and the second photo-coupler PC2. The system control signal outputted from the system controller 111 is used as a reference voltage to generate the PWM signal at the inverter controller 103.

For example, when the user selects 'high-level cooking' through the function key input device 100, the system controller 111, as shown in FIG. 3, turns on the first photo-coupler PC1 and the second photo-coupler PC2, the DC voltage supplied by the second rectifier 109 enters the negative feedback amplifier 106 as a reference voltage through the resistors R2 and R3. Also, when the user selects 'medium cooking', the system controller 111 turns on the first photo-coupler PC1 only, and the DC voltage enters the negative feedback amplifier 106 as a reference voltage through the resistor R2. The voltage at this time is lower than that entered which the negative feedback amplifier 106 when 'high-level cooking' is selected. When the user selects 'low-level cooking', the system controller 111 turns on the second photo-coupler PC2 only, and the DC voltage enters the negative feedback amplifier 106 as a reference voltage through the resistor R3. The voltage at this time is lower than that entered the negative feedback amplifier 106 when 'medium cooking' is selected. At this time, the resistance of the resistor R2 is set smaller than that of the resistor R3.

Meanwhile, the voltage level of the current detected from the current detector 105 enters the container detector 114 so as to be compared with the reference voltage Vref. That is, when the voltage level detected from the current detector 105 is higher than the reference voltage Vref, the output of the container detector 114 becomes, 'high' and the system controller determines that there is no container 112 on the working coil 102*a*.

The third photo-coupler PC3 in the high voltage/low voltage separating device 113 is turned on by the 'high' level output of the container detector 114, and accordingly, the system controller 111 stops the operation of the inverter section 102 by turning off the first and second photo-couplers PC1 and PC2 regardless of the function key input from the function key input device 110. Meanwhile, when the voltage level detected from the current detector 105 is lower than the reference voltage Vref, the output of the container detector 114 becomes 'low', and the system controller 111 determines that there is the container 112 on the working coil 102*a*.

The third photo-coupler PC3 is turned off by the 'low' level output, and accordingly, the whole system works normally. At this time, the output from the current detector 105 as the high voltage enters the system controller 111 not directly, but through the third photo-coupler PC3, resulting in that the high voltage circuit portion and the low voltage circuit portion can be separated from each other.

What is claimed is:

1. An inverter cooker with a high voltage/low voltage separating device, comprising:

a first rectifying and smoothing means for rectifying and smoothing an input AC source of a current and providing an output of said first rectifying and smoothing means;

a container;

an inverter for heating food in said container with an eddy current generated by electromagnetic induction effect by switching the output of said first rectifying and smoothing means;

an inverter controller for generating a PWM signal for controlling said inverter;

a current detector for detecting said current from said input AC source, the current detector providing an output of said current detector;

a second rectifying and smoothing means for rectifying and smoothing said input AC source and providing an output voltage of said second rectifying and smoothing means;

a function key input means for selecting cooking and other functions and providing an output of said function key input means, the function key input means operating with the output voltage of said second rectifying and smoothing means;

a system controller for controlling the operation of said inverter cooker according to the output of said function key input means and for providing an output signal of said system controller, said system controller operating with the output of said second rectifying and smoothing means;

means for detecting the existence of said container according to the output of said current detector and for providing an output signal of said container detecting means; and a high voltage/low voltage separating means for delivering the output signal of said system controller to said inverter controller with said system controller and said inverter controller electronically separated from each other, and delivering the output signal of said container detecting means of said system controller with said container detecting means and said system controller electrically separated from each other.

2. An inverter cooker with a high voltage/low voltage separating device as claimed in claim 1, wherein said high voltage/low voltage separating means comprises a plurality of photo-couplers for electrically separating the input and output signals of said system controller.

* * * * *